United States Patent
Chang et al.

[11] Patent Number: 5,933,485
[45] Date of Patent: Aug. 3, 1999

[54] CALL RESERVATION TECHNIQUE FOR A SUBSCRIBER OF ANOTHER EXCHANGE UTILIZING A NO. 7 SIGNAL

[75] Inventors: Jeong-Sik Chang, Gumi; Byung-Hae Jung, Seoul, both of Rep. of Korea

[73] Assignee: SamSung Electronics Co., Ltd., Suwon, Rep. of Korea

[21] Appl. No.: 08/760,565

[22] Filed: Dec. 4, 1996

[30] Foreign Application Priority Data

Dec. 4, 1995 [KR] Rep. of Korea .................. 46433/1995

[51] Int. Cl.⁶ .................................................. H04M 3/48
[52] U.S. Cl. .......................... 379/207; 379/208; 379/209
[58] Field of Search .................................. 379/209, 208, 379/201, 207, 230

[56] References Cited

U.S. PATENT DOCUMENTS

| | | |
|---|---|---|
| 4,942,601 | 7/1990 | Park ......................................... 379/209 |
| 4,969,185 | 11/1990 | Dorst et al. .............................. 379/209 |
| 4,975,944 | 12/1990 | Cho ........................................ 379/209 |
| 5,212,691 | 5/1993 | Hokari . |
| 5,249,222 | 9/1993 | Pinard . |
| 5,384,840 | 1/1995 | Blatchford et al. . |
| 5,487,110 | 1/1996 | Bray et al. . |
| 5,517,564 | 5/1996 | Slater et al. . |
| 5,519,770 | 5/1996 | Stein . |
| 5,550,914 | 8/1996 | Clarke et al. . |
| 5,559,877 | 9/1996 | Ash et al. . |

*Primary Examiner*—Ahmad F. Matar
*Attorney, Agent, or Firm*—Robert E. Bushnell, Esq.

[57] ABSTRACT

A call reservation technique of a first exchange serving a call of an outgoing subscriber and a second exchange serving a call of an incoming subscriber includes: outputting a message requiring a call reservation registration from the first exchange to the second exchange at the time of reserving the call, and in the second exchange, storing call reservation information according to the message requiring the call reservation registration, the second exchange being transferred to a state of the call reservation registration in response to the message requiring the call reservation registration and simultaneously outputting a call reservation registration response message, and in the first exchange, storing the call reservation information according to the call reservation registration response message and the first exchange being transferred to a state of a call reservation; and checking the state of the incoming subscriber in the state of the call reservation registration in the second exchange and then inputting the message requiring the call reservation service to the second exchange when the incoming subscriber is in an idle state, and checking the state of the outgoing subscriber according to the message requiring the call reservation service in the first exchange and then forming a calling path of the outgoing subscriber and the incoming subscriber in the first exchange and the second exchange and processing the call, when the outgoing subscriber is in the idle state.

6 Claims, 12 Drawing Sheets

CALL RESERVATION TECHNIQUE FOR A SUBSCRIBER OF ANOTHER EXCHANGE UTILIZING A NO. 7 SIGNAL

CLAIM OF PRIORITY

This application claims all benefits accruing under 35 U.S.C. §119 from an application for A CALL RESERVATION METHOD FOR A SUBSCRIBER OF OTHER EXCHANGE UTILIZING A No. 7 SIGNAL earlier filed in the Korean Industrial Property Office on Dec. 4, 1995 and there duly assigned Ser. No. 46433/1995.

BACKGROUND OF THE INVENTION

1. Field of the Invention

The present invention relates to a call reservation technique, and more particularly to a call reservation technique for a subscriber of another exchange utilizing a No. 7 signal.

2. Description of the Related Art

In earlier systems, a No. 7 signaling system has been applied and has served an electronic exchange as a common channel signaling system (hereinafter, referred to as a "CCS") recommended by the CCITT in 1980 for use in a telephone and data communication network as well as an integrated services digital network. When another exchange subscriber reserves and processes a call in some electronic exchanges, the call is processed in view of a call reattempt, not a call reservation. In other words, the electronic exchange has been embodied in such manner that, if an outgoing subscriber reserves an incoming subscriber call of another exchange, the outgoing exchange generates the call in a certain time interval and at certain times (for example, repeatedly at a two-minutes intervals and for ten times, the call being generated by the exchange), thereby connecting the call signal to the incoming subscriber if the incoming subscriber is in the idle state, or connecting the call signal to the outgoing subscriber if the incoming subscriber responds, or connecting a calling path if the outgoing subscriber responds. In the above system, when the call is generated in the exchange, the call is again generated beyond a certain time interval if the incoming subscriber is in the on-line state.

We have observed that the earlier call reservation method for another exchange subscriber has, among other, the following three notable disadvantages. First, there is the disadvantage in that the exchange of the outgoing subscriber repeatedly generates and transmits the call every predetermined time interval to the exchange of the incoming subscriber, thereby causing an unnecessary occupation of the inter-office trunk, and in which a load of the incoming exchange and the outgoing exchange (especially, the incoming exchange) is increased, thereby making it impossible to be in common use.

Second, even though the incoming subscriber is transferred to the idle state (that is, transferred to the calling ending state), the call cannot be immediately connected between the reserved outgoing subscriber and the incoming subscriber. This is because the incoming subscriber cannot be managed in the exchange of the outgoing subscriber. Third, if several outgoing subscribers reserve the call for an identical incoming subscriber, it is impossible to serve a call connection according to a reservation sequence since the call is again attempted in the exchange of the outgoing subscriber.

Other efforts in the art, for example, are those represented by U.S. Pat. No. 5,559,877 to Ash et al., entitled *Automatic Provisioning Of Trucking And Routing Parameters In A Telecommunications Network*, U.S. Pat. No. 5,550,914 to Clarke et al., entitled *Communications Signaling Network Apparatus*, U.S. Pat. No. 5,519,770 to Stein, entitled *Enhanced Telephony Apparatus And System*, U.S. Pat. No. 5,517,564 to slater et al., entitled *Communication Apparatus And Method*, U.S. Pat. No. 5,487,110 to Bray et al., entitled *Apparatus And Method For Virtual Private Telephone Line With Automatic Ring Down*, U.S. Pat. No. 5,384,840 to Blatchford et al., entitled *Telecommunications System SS7 Signaling Interface With Signal Transfer Capability*, U.S. Pat. No. 5,212,691 to Hokari, entitled *Private Network With Means For Establishing Virtual Tie Trunks Between PRXs Through ISDN Public Network*, and U.S. Pat. No. 5,249,222 to Pinard, entitled *Host Remote Signaling In Telephone Systems*. We have found however, that these efforts fail to teach or suggest an efficacious and reliable call reservation technique of the present invention:

SUMMARY OF THE INVENTION

It is therefore an object of the present invention to provide an improved circuit and process for reserving a call to an exchange.

It is another object to provide a circuit and process for reserving a call to an exchange of an incoming subscriber in an exchange of an outgoing subscriber by utilizing a No. 7 signaling in an electronic exchange.

It is still another object to provide a circuit and process for reserving and processing subscribers of other exchanges while information is mutually transmitted and received between an exchange of an outgoing subscriber and an exchange of an incoming subscriber in an electronic exchange utilizing a No. 7 signal.

To achieve this and other objects, the present invention provides a call reservation technique of a first exchange serving a call of an outgoing subscriber and a second exchange serving a call of an incoming subscriber, by outputting a message requiring a call reservation registration from the first exchange to the second exchange at the time of reserving the call, and in the second exchange, storing call reservation information according to the message requiring the call reservation registration, being transferred to a state of the call reservation registration in response to the message requiring the call reservation registration and simultaneously outputting a call reservation registration response message, and in the first exchange, storing the call reservation information according to the call reservation registration response message and being transferred to a state of a call reservation; and checking the state of the incoming subscriber in the state of the call reservation registration in the second exchange and then inputting the message requiring the call reservation service to the second exchange when the incoming subscriber is in an idle state, and checking the state of the outgoing subscriber according to the message requiring the call reservation service in the first exchange and then forming a calling path between the outgoing subscriber and the incoming subscriber in the first exchange and the second exchange and processing the call, when the outgoing subscriber is in the idle state.

The above-noted object may also be achieved by providing a call reservation technique of a first exchange serving a call of an outgoing subscriber and a second exchange serving a call of an incoming subscriber, by outputting a message requiring a call reservation registration from said first exchange to said second exchange at the time of reserving said call, and in said second exchange, storing call reservation information according to said message requiring said call reservation registration, being transferred to a state of said call reservation registration in response to said message requiring said call reservation registration and simultaneously outputting a call reservation registration response message, and in said first exchange, storing said call reservation information according to said call reservation registration response message and being transferred to a state of a call reservation; checking said state of said incoming subscriber in said state of said call reservation registration in said second exchange and then inputting said message requiring said call reservation service to said second exchange when said incoming subscriber is in an idle state, and checking said state of said outgoing subscriber according to said message requiring said call reservation service in said first exchange and then forming a calling path of said outgoing subscriber and said incoming subscriber in said first exchange and said second exchange and processing said call, when said outgoing subscriber is in said idle state; and outputting a message requiring a call reservation cancellation from said first exchange at the time of receiving a call reservation cancellation code in said state of said call reservation, responding to said message requiring said state of said call reservation cancellation and deleting said call reservation information in said second exchange, and deleting said call reservation information according to said response message of said call reservation cancellation in said first exchange.

These objects may further be achieved by providing a technique for serving a reserved call between a first exchange serving a call of an outgoing subscriber being in a call reservation state, and a second exchange serving a call of an incoming subscriber being in a call reservation registration state, by transmitting a message requiring a call reservation service at the time of an incoming subscriber in said second exchange being in said call reservation registration state; checking a state of said outgoing subscriber reserving said call in said first exchange receiving said message requiring said call reservation service; outputting a response message notifying a call reservation service requirement failure when said outgoing subscriber is not in an idle state; repeatedly performing said checking and outputting steps by transferring said state of said incoming subscriber to said state of said call reservation registration in said second exchange receiving said response message of said call reservation service requirement failure; outputting a response message of a call reservation service requirement success when said outgoing subscriber is in an idle state; transferring said state of said incoming subscriber to a call reservation service standby state in said second exchange receiving said response message of said call reservation service requirement success; and forming a calling path of said outgoing subscriber and said incoming subscriber in said first exchange and said second exchange, so as to perform a calling service.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
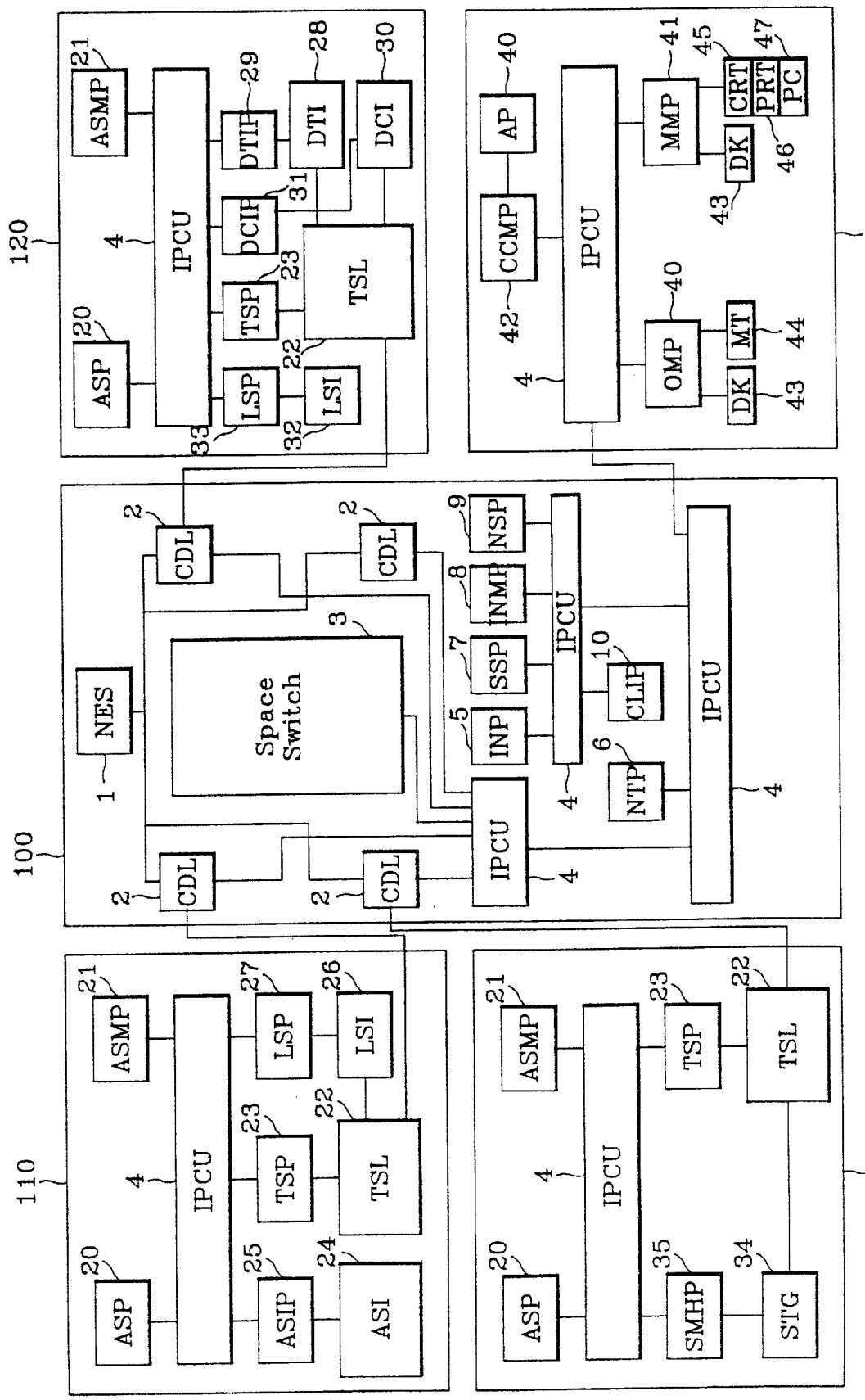
FIG. 1 is a block diagram illustrating a system for performing a call reservation technique constructed according to the principles of the present invention.

Turning now to the drawings, FIG. 1 is a block diagram of an electronic exchange system. Reference number 100 indicates a switch network sub system. The switch network sub system 100 comprises: a network synchronization unit (NES) 1; a plurality of central data links (CDL) 2; a space switch 3; an inter processor communication unit (IPCU) 4 for controlling a communication between processors; and a plurality of control processors 5 through 10, inclusive. The control processors of the switch network sub system 100 are formed with an inter network processor (INP) 5 for controlling an entire calling path system; a number translation processor (NTP) 6 for controlling a function of the number-translation and routing; a network synchronization processor (NSP) 9 for controlling the network synchronization unit 1; an interconnection network maintenance processor (INMP) 8 for performing maintenance of the switch network; a space switch processor (SSP) 7 for controlling the space switch 3; and a central link interface processor (CLIP) 10 for controlling a processor communication control unit of a central system.

Reference numbers 110, 120 and 130 respectively indicate access switch sub systems. The access switch sub system is classified into a subscriber sub system 110, a trunk sub system 120 and a No.7 signal process sub system 130. The access switch sub systems 110, 120 and 130 commonly comprise: an access switch processor (ASP) 20 for controlling the access switch system; an access switch maintenance processor (ASMP) 21 for performing maintenance of the access switch sub system; a time switch and local data link (TSL) 22; and a time switch processor (TSP) 23 for controlling the time switch and local data link 22. The subscriber access switch sub system 110 also comprises: an analog subscriber interface (ASI) 24; an analog subscriber interface processor (ASIP) 25 for controlling the analog subscriber interface 24; and a local service processor (LSP) 27 for processing a dual tone multi frequency signal and audible signals.

The trunk access switch sub system 120 also uses a digital T1 interface (DTI) 28; a digital T1 interface processor (DTIP) 29 for controlling the digital T1 interface 28; a digital CEPT interface (DCI) 30, and a digital CEPT interface processor (DCIP) 31 for controlling the digital CEPT interface 30; a local service interface (LSI) 32 for processing an R2 signal; and a local service processor (LSP) 33 for controlling the local service interface 32. The No. 7 signal access switch sub system 130 also comprises: a No. 7 signaling terminal group (STG) 34; and a signaling message handling processor (SMHP) 35 for controlling the No. 7 signaling terminal group 34.

Reference number 140 indicates an operating and maintenance switch sub system. The operating and maintenance switch sub system 140 has an operating and maintenance processor (OMP) 40 for performing an operation and maintenance; a man machine processor (MMP) 41 for processing a man-machine communication; a common control maintenance processor (CCMP) 42 for performing the maintenance of the operating and maintenance switch sub system; and several peripheral units 43–47. The peripheral units include a disk drive (DK) 43, a magnetic tape drive (MT) 44, a printer (PRT) 46, a cathode ray tube display monitor (CRT) 45, a personal computer (PC) 47 and an alarm panel (AP) 48.

Figure 2A:
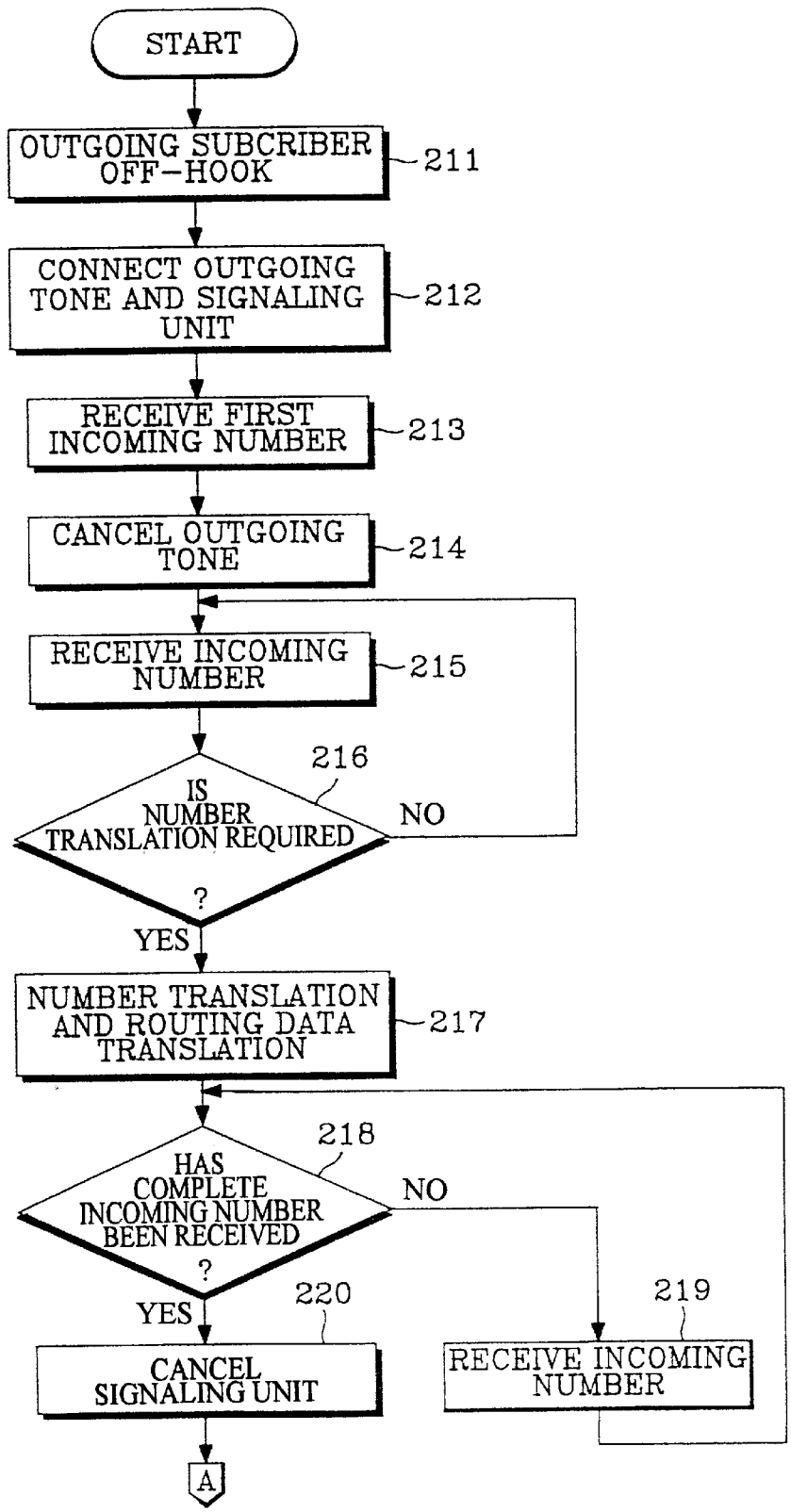
FIGS. 2A–2B together form a flowchart illustrating an earlier call reservation registration procedure at the time of processing a call reservation for another exchange subscriber.
Figure 2B:
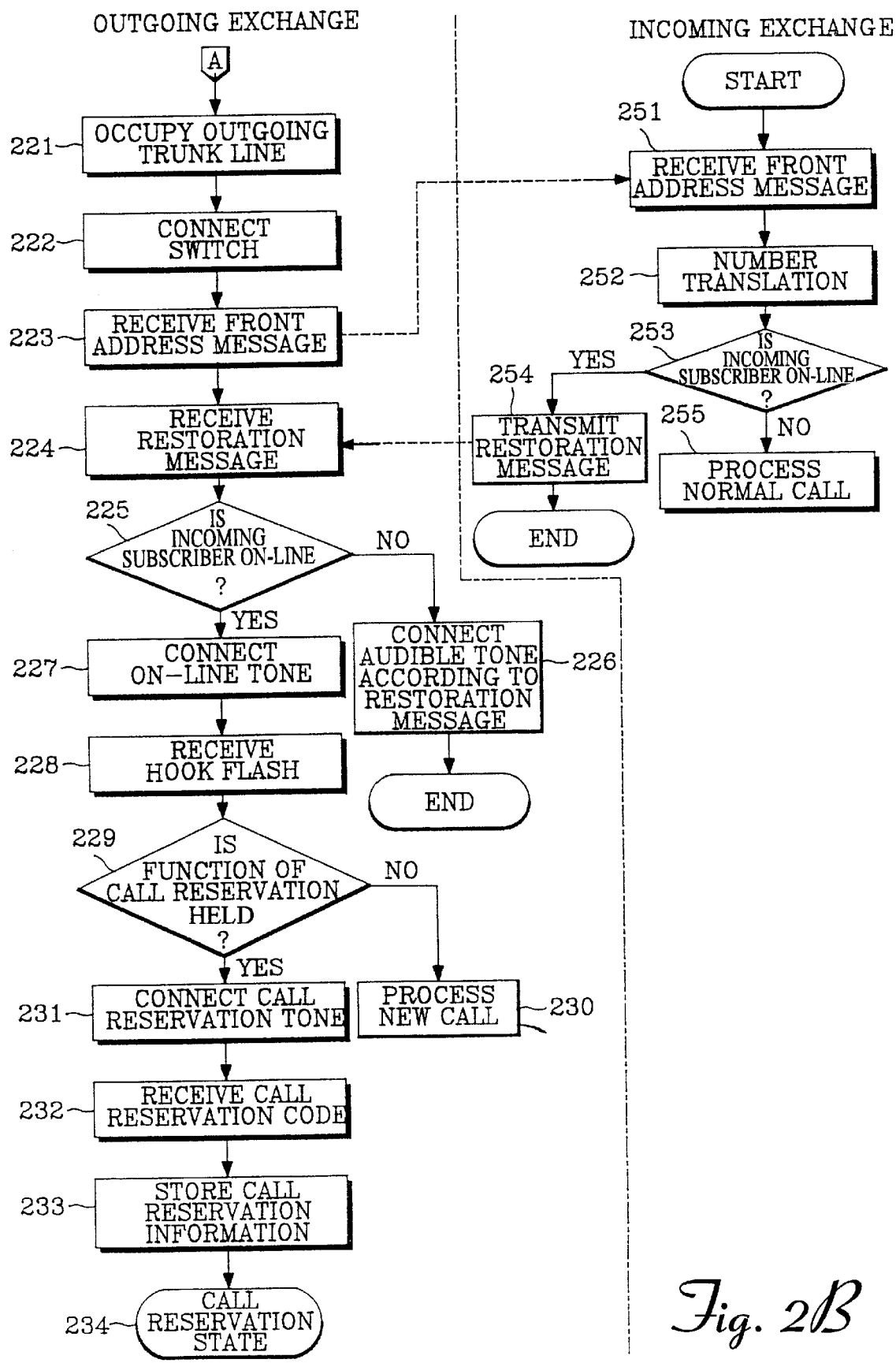
Figure 3A:
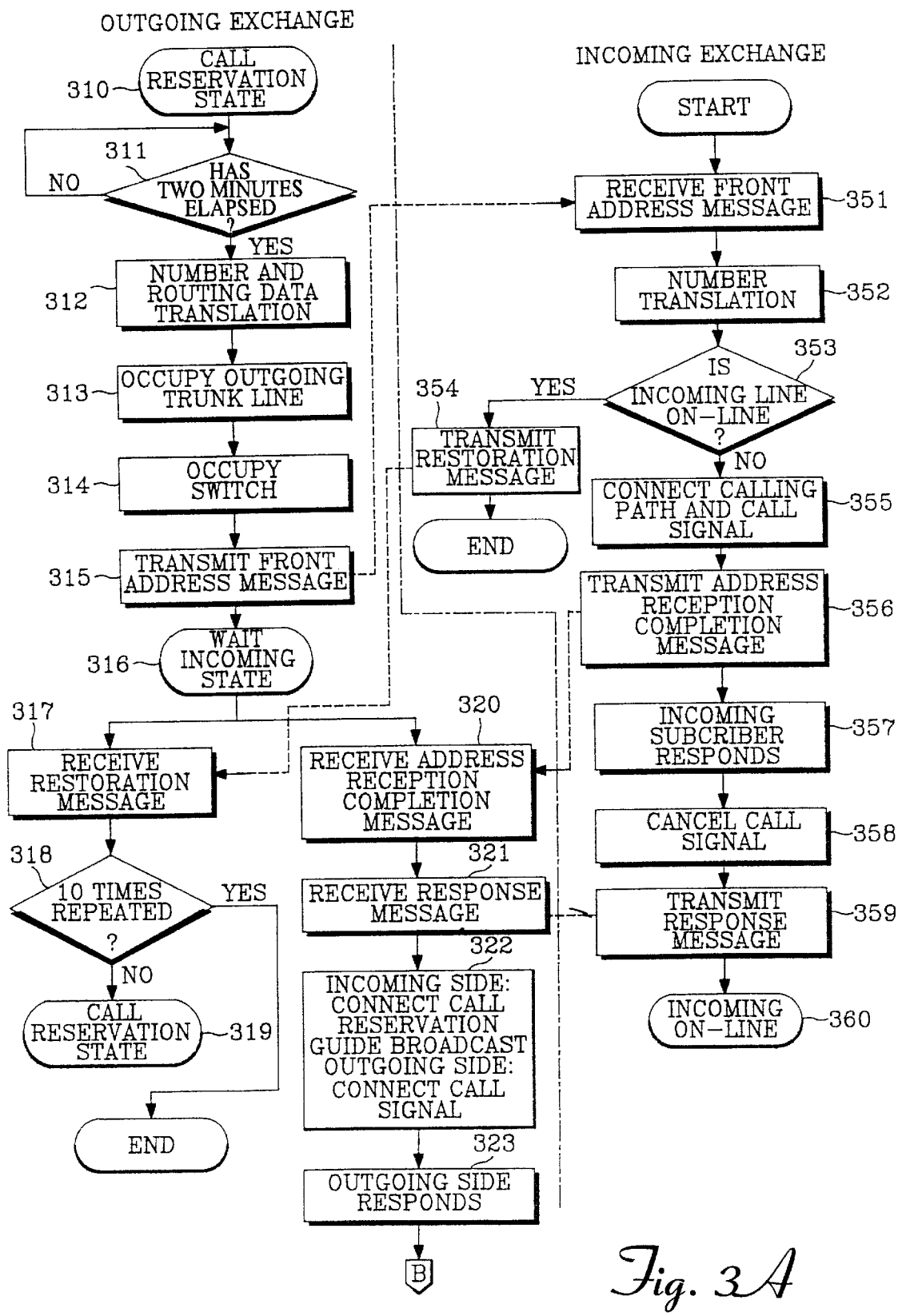
FIGS. 3A–3B together form a flowchart illustrating an earlier procedure of processing a reserved call at the time of processing a call reservation for another exchange subscriber.
Figure 3B:
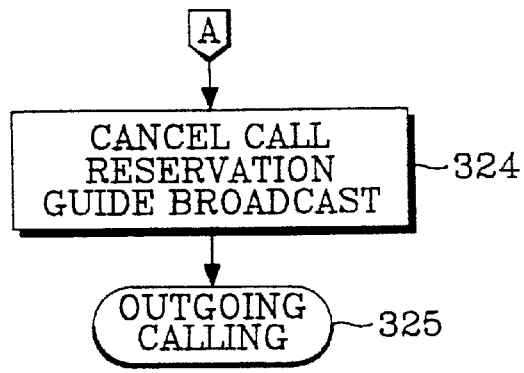
Figure 4:
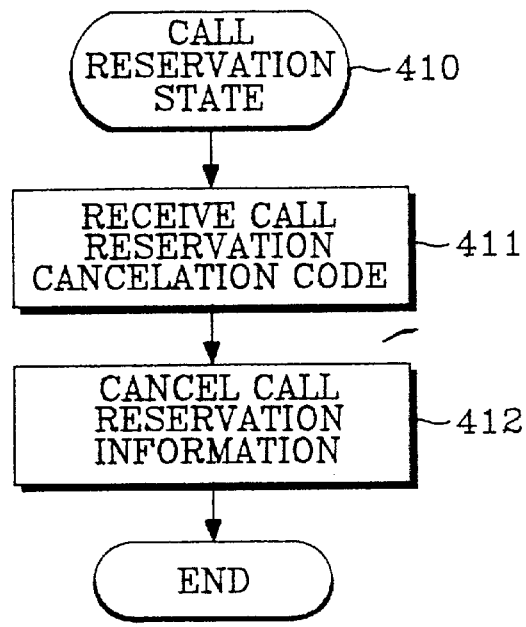
FIG. 4 is a flowchart illustrating an earlier procedure of canceling a reserved call at the time of processing a call reservation for another exchange subscriber.

FIGS. 2A–2B together form a flowchart illustrating a procedure of registering a call reservation in the electronic exchange system of FIG. 1, FIGS. 3A–3B together form a flowchart illustrating a procedure of processing a reserved call in the electronic exchange system, and FIG. 4 is a flowchart illustrating a procedure of canceling the reserved call in the electronic exchange system. First, referring to FIGS. 2A–2B, a procedure of reserving the call to the exchange of the incoming subscriber in the exchange of the outgoing subscriber will be described in the following paragraphs.

At first, if the outgoing subscriber performs a hook-off operation, a state change of a corresponding subscriber port is generated in the analog subscriber interface 24 of the subscriber sub system 110. Then, in step 211, the analog subscriber interface processor 25 senses the state change of the analog subscriber interface 24, and transmits hook-off information to a subscriber process block of the access switch processor 20 through the communication unit 4 disposed between the processors. In the subscriber call process block receiving the hook-off information, the subscriber state (the outgoing process possibility and a system state) is checked. When the outgoing process is possible, in order to perform an outgoing tone connection and the signaling unit connection, the time switch processor (TSP) 23 must be connected to the time switch and local data link (TSL) 22 and the local service processor (LSP) 27 must occupy the local service interface (LSI) 26.

If the subscriber dials the number of a first incoming subscriber, the local service processor detects dial information of the subscriber, and notifies the access switch processor 20 of the detected dial information. Then, the access switch processor 20 receiving dial information of the subscriber in step 213 inputs a time switch cancellation signal to the time switch processor 23 in order to cancel the outgoing tone which is being transmitted to the subscriber in step 214, and accordingly the time switch processor 23 controls the time switch and local data link 22, thereby canceling the outgoing tone transmitted to the subscriber.

The subscriber call process block receives the dial information which the subscriber continues to dial, through steps 215 and 216. At this time, if certain numbers (for example, 3) are received, a determination is made as to whether the certain numbers have been received in step 216, thereby requiring the number translation processor 6 to perform the number translation and routing data translation. And then, after the number translation processor 6 analyzes the dialing number of the subscriber and translates routing data, a result of analysis and translation is provided to the subscriber call process block. The access switch processor 20 receives the number of the incoming subscriber in steps 218 and 219, and upon completion of receiving, cancels the signaling unit and requires the number translation processor 6 to perform a routing in step 220. The number translation processor 6 receiving the routing request of access switch processor 20 requires the access switch processor 20 of the trunk access switch sub system 120 to perform an outgoing trunk occupation, and processor 20 selects an idle trunk within a route, notifies processor 20 of the subscriber access switch sub system 110 of the trunk occupation, and transmits a front address message No. 7 signal SMHP processor 35 in step 221.

Processor 20 receiving the trunk occupation notification outputs a switch connection requiring signal therefrom in step 222. Inter network processor 5 of switch network sub system 100 performs a switch connection, thereby seeking an idle path of the outgoing/incoming exchanges, if the idle path is sought, the space switch processor 7 performing the path connection, thereby accomplishing the switch connection. Space switch processor 7 receiving the path connection request controls and connects space switch 3 thereto, and then notifies the result thereof to outgoing processor 20. No. 7 signal processor 20 transmits the front address message to the incoming exchange through No. 7 signaling terminal group 34 in step 223.

The incoming exchange receiving the front address message extracts the number of the incoming subscriber from the front address message received in step 251, and translates the extracted number in step 252. The processor 20 of the subscriber access switch sub system 110 of the incoming exchange checks the state of the incoming subscriber corresponding to the received subscriber number in step 253. At this time, if the incoming subscriber is in the on-line state, a restoration message is transmitted to the outgoing exchange in step 254, and if the incoming subscriber is not in the on-line state, a process of a normal call connection is performed in step 255.

In other words, if the normal call is connected to the incoming subscriber as in step 255, the outgoing exchange and the incoming exchange form the calling path of the outgoing subscriber and the incoming subscriber, thereby performing the calling service. However, if the incoming subscriber is in the on-line state, the normal call cannot be formed. In this case, the incoming exchange transmits the restoration message to the outgoing exchange in step 254.

Accordingly, if the outgoing exchange receives the restoration message from the incoming exchange, a determination is made as to whether the incoming subscriber is in the on-line state in step 225. If the incoming subscriber is not in the on-line state, the audible signal caused by the restoration message is connected to the incoming subscriber and ending step is performed. However, if it is determined that the incoming subscriber is in the on-line state in step 225, the on-line tone is connected to the outgoing subscriber in step 227.

If the outgoing subscriber performs a hook-flash for a calling reservation in an outputting state of the on-line tone, the processor 20 of the subscriber access switch sub system 110 receives a hook-flash signal of the outgoing subscriber in step 228. If the outgoing subscriber is not provided with a call reservation function, the hook-flash signal is recognized as a new call, thereby connecting the outgoing tone to the subscriber and perform a new call processing procedure in step 230. However, if the outgoing subscriber is provided with the call reservation function, the call reservation tone is connected to the outgoing subscriber in step 231.

If the call reservation tone is outputted as above, and if the outgoing subscriber dials a call reservation code (for example, *10*), the processor 20 of the subscriber access switch sub system 110 receives the call reservation code in step 232, stores information of the incoming subscriber and the number of the outgoing subscriber therein in step 233, and is transferred to the call reservation state, thereby performing the calling service in step 234.

Second, referring to FIGS. 3A–3B, how a call has reserved by communicating with the exchange of the incoming subscriber after the call is reserved in the exchange of the outgoing subscriber, is described as follows. If a certain time (for example, two minutes) is elapsed in the state of the call reservation as in step 310, the passage of time is recognized in step 311 and the stored number of the incoming subscriber is translated, thereby obtaining the information necessary for the routing in step 312. Trunk process processor 20 then occupies the outgoing trunk to be assigned to the subscriber from translated routing information in step 313, notifies the subscriber process processor 20 of the outgoing trunk occupation, and requires the transmission of the front address message to the incoming exchange.

The subscriber process processor 20 receiving the outgoing trunk occupation notification notifies the switch network sub system 100 of the outgoing trunk occupation in step 314, performing a connection of the switch. The No. 7 signal process processor 20 transmits the front address message to the exchange of the incoming subscriber. The exchange of the outgoing subscriber is transferred to the incoming standby state in step 316.

After the exchange of the incoming subscriber receiving the front address message extracts information of the incoming subscriber from the front address message in step 351, the number of the incoming subscriber is translated in step 352. After number-translating, a state of the incoming subscriber is checked in step 353. If the incoming subscriber is in the on-line state, the restoration message is transmitted to the exchange of the outgoing subscriber in step 354, and if the incoming subscriber is in the idle state, steps 355 to 360 are performed.

If the exchange of the incoming subscriber outputs the restoration message therefrom, the exchange of the outgoing subscriber, being in the incoming standby state in the step 316, receives the restoration message in step 317, and a determination is made as to whether the number of calling attempt times according to the call reservation exceeds a predetermined number of times in step 318. It is assumed that the predetermined times are equal to 10. Accordingly, the exchange of the outgoing subscriber maintains a call reservation state in step 319 if the number of repetitive calling attempt times are not equal to 10 according to the call reservation of the step 318. In the call reservation state, the exchange of the outgoing subscriber repeatedly performs steps 311 to 315 every predetermined time period (two minute period), performing an attempt according to the call reservation. However, if the number of calling attempt times according to the call reservation reaches 10 times in the step 318, the call reservation state is canceled and the ending step is performed.

If the incoming subscriber is in the idle state in the exchange of the incoming subscriber, it is recognized that the incoming subscriber is in the idle state in step 353, the calling path is connected between the incoming subscriber and the incoming trunk in step 355, the call tone is connected to the exchange of the outgoing subscriber, and the call signal is connected to the incoming subscriber. The exchange of the incoming subscriber transmits a message of an address reception completion to the exchange of the outgoing subscriber in step 356. If the incoming subscriber responds, it is recognized that the incoming subscriber responds in step 357, the call signal transmitted to the outgoing subscriber is canceled, and the call tone transmitted to the outgoing subscriber is canceled in step 358. The exchange of the incoming subscriber transmits a response message to the exchange of the outgoing subscriber, and the incoming subscriber is transferred to the on-line state in step 359.

If the message of the address reception completion is outputted from the exchange of the incoming subscriber, the exchange of the outgoing subscriber, being in the incoming standby state in step 316, receives the message of the address reception completion in step 320, and receives the response message in step 321. The exchange of the outgoing subscriber connects "call reservation" guide broadcast to the incoming subscriber in step 322, and connects the call signal to the outgoing subscriber. If the outgoing subscriber to which the call signal is connected responds, the exchange of the outgoing subscriber recognizes a response of the outgoing subscriber in step 323, cancels the call reservation guide broadcast connected to the incoming subscriber and gets to be in the outgoing on-line state.

FIG. 4 is a flowchart illustrating an earlier procedure in which the call is reserved in the exchange of the outgoing subscriber, and then the reserved call is cancelled. Referring to FIG. 4, step 410 illustrates the call reservation state for automatically outgoing in a storage state of information which the outgoing subscriber dials in the exchange of the outgoing subscriber every predetermined time interval (two minutes). In the call reservation state, if the outgoing subscriber performs an hook-off operation and then dials the call reservation cancellation code (for example, #10*) to cancel the reserved call, the exchange of the outgoing subscriber recognizes the call reservation cancellation code in step 411, and cancels the call reservation information of information of the outgoing subscriber and the incoming subscriber being stored in step 412.

A preferred embodiment of the present invention will be described with reference to attached figures in the following. It should be noted that identical parts of the figures are indicated by identical symbols. A No. 7 signaling which is a common channel signaling (CCS) recommended by CCITT in 1980 is applied to an electronic exchange and is in common use, so that the No. 7 signaling can be used in telephone and data communication as well as in an integrated services digital network. In the case that the No. 7 signaling is changed into a Korean standard inter-office trunk signaling, the call service of the exchange is changed. To solve a problem of a call reattempt function of another exchange subscriber embodied in some earlier electronic exchanges, the call reservation technique according to the present invention defines and embodies functions of a call reservation application service (RECASE) and a call reservation application processor (REGAP) on the basis of functions of a transaction capabilities application part (TCAP), a signaling connection control part (SCCP), and a message transfer part (MTP) utilizing the Korean standard No. 7 signaling, and embodies a function of reserving and processing another exchange subscriber so that information can be mutually transmitted and received between the exchange of the outgoing subscriber and the exchange of the incoming subscriber.

Figure 5A:
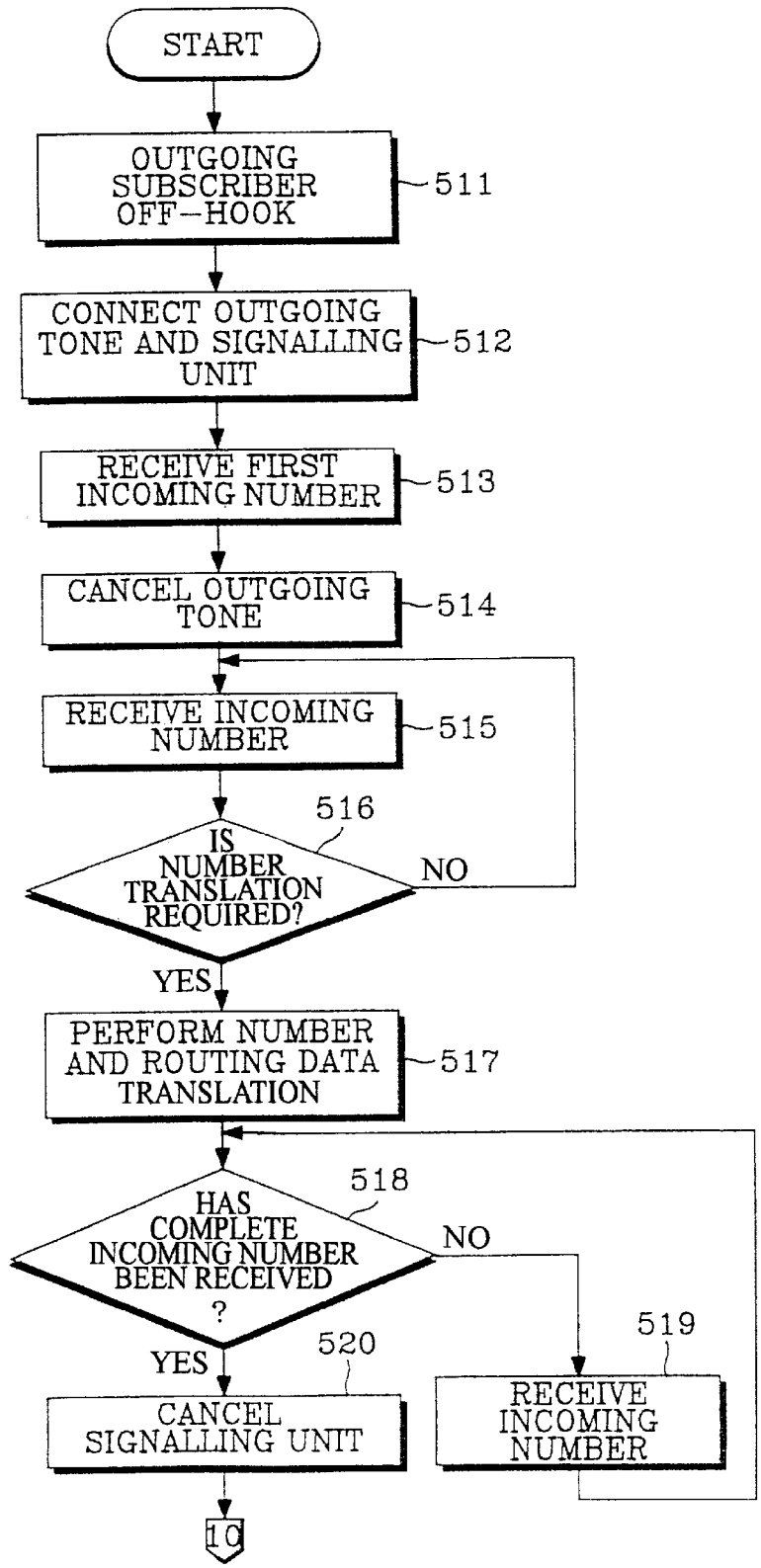
FIGS. 5A–5C together form a flowchart illustrating a call reservation registration procedure at the time of processing a call reservation for another exchange subscriber according to the present invention.
Figure 5B:
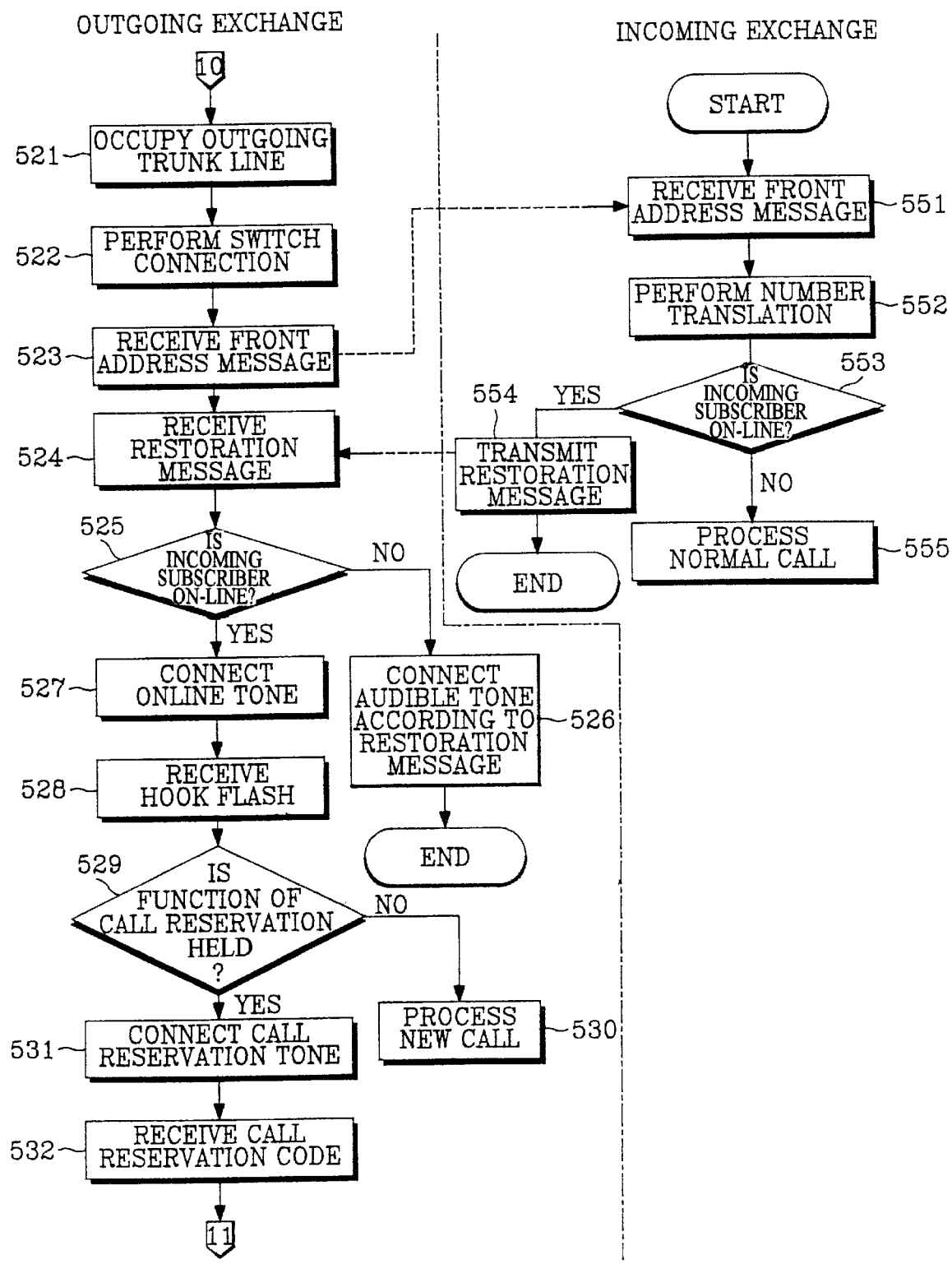
Figure 5C:
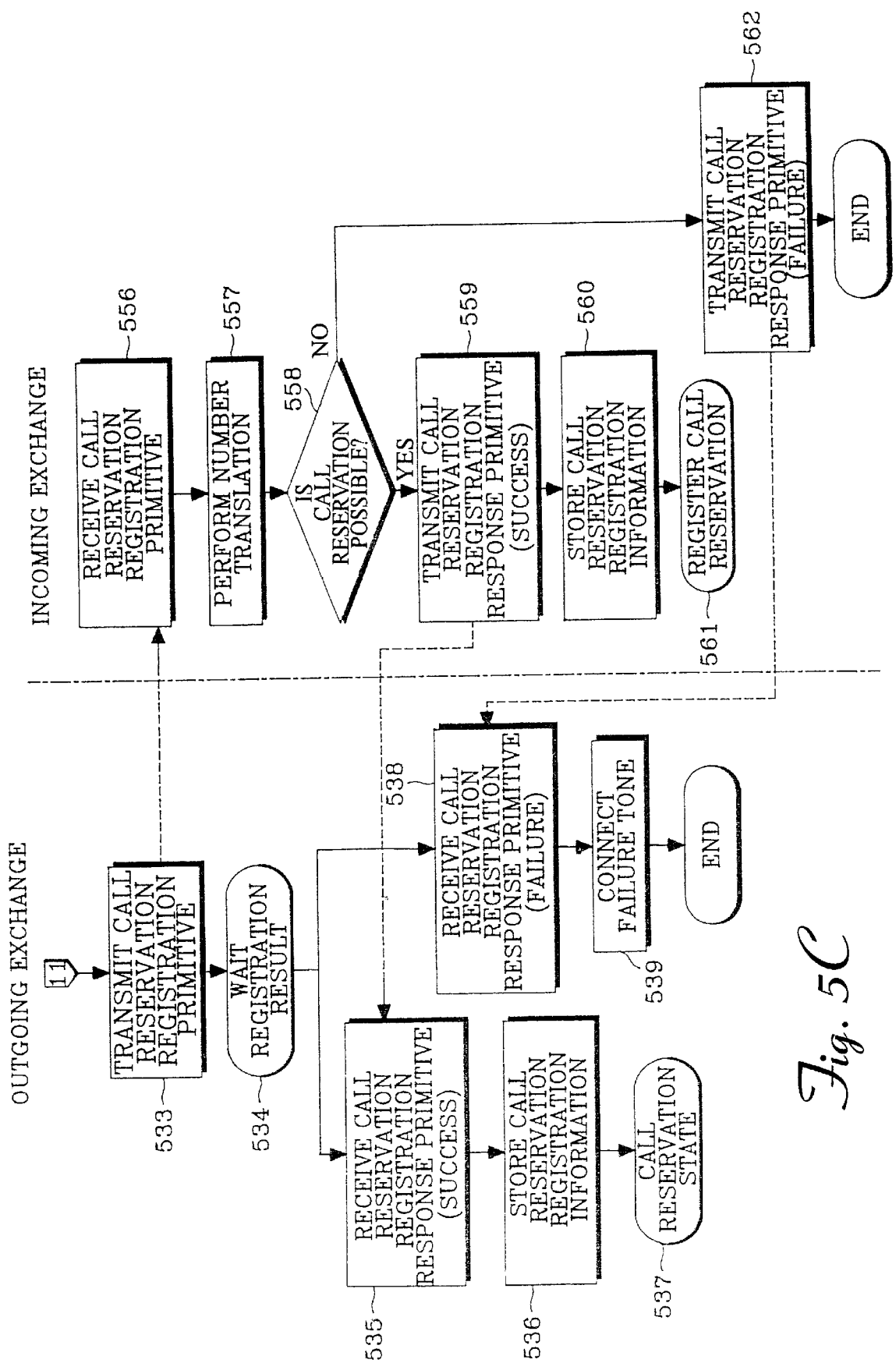

FIGS. 5A–5C together form a flowchart illustrating a procedure of performing the call reservation between the exchange of the outgoing subscriber and the exchange of the incoming subscriber according to the present invention.

Figure 6A:
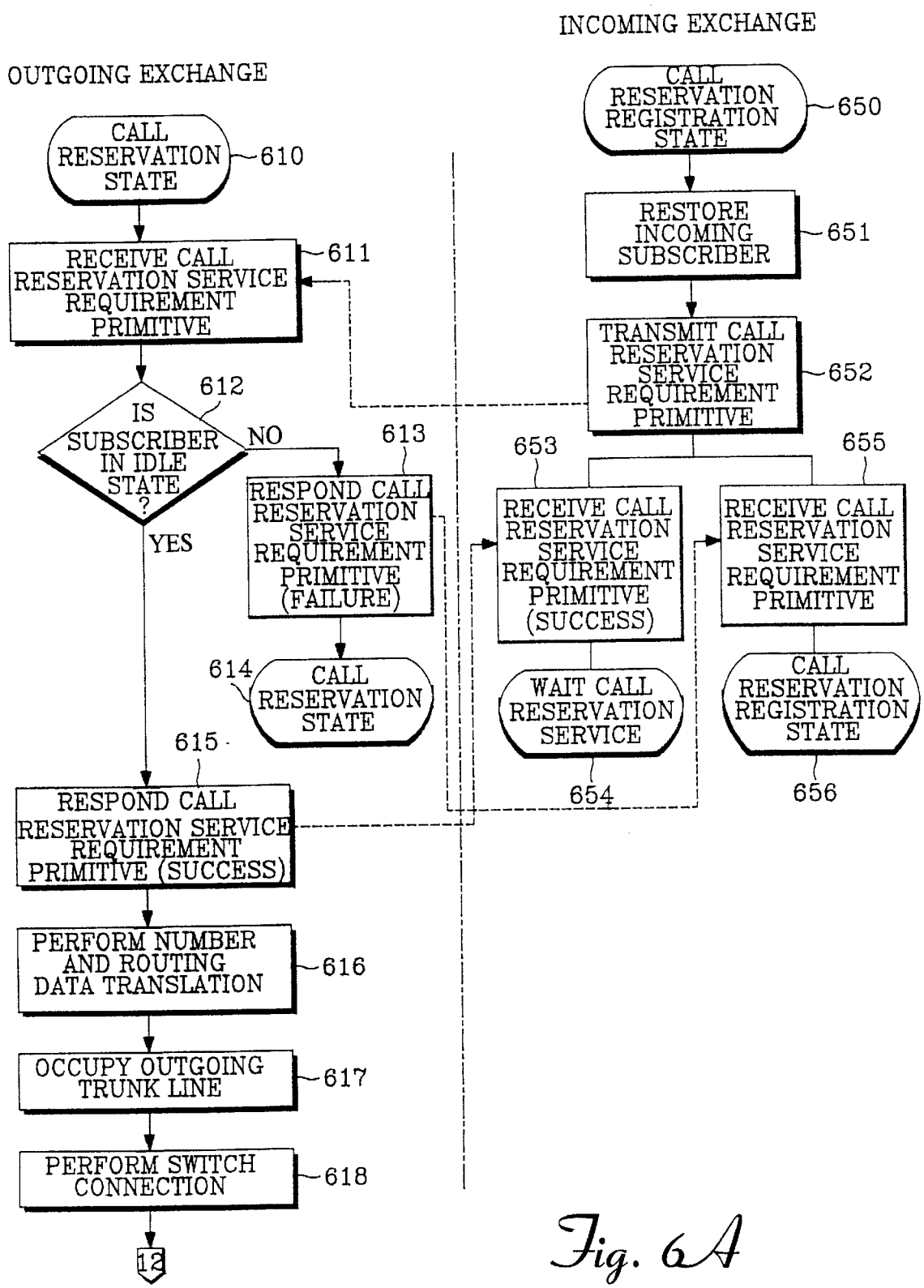
FIGS. 6A–6B together form a flowchart illustrating a procedure of processing a reserved call at the time of processing a call reservation for another exchange subscriber according to the present invention.
Figure 6B:
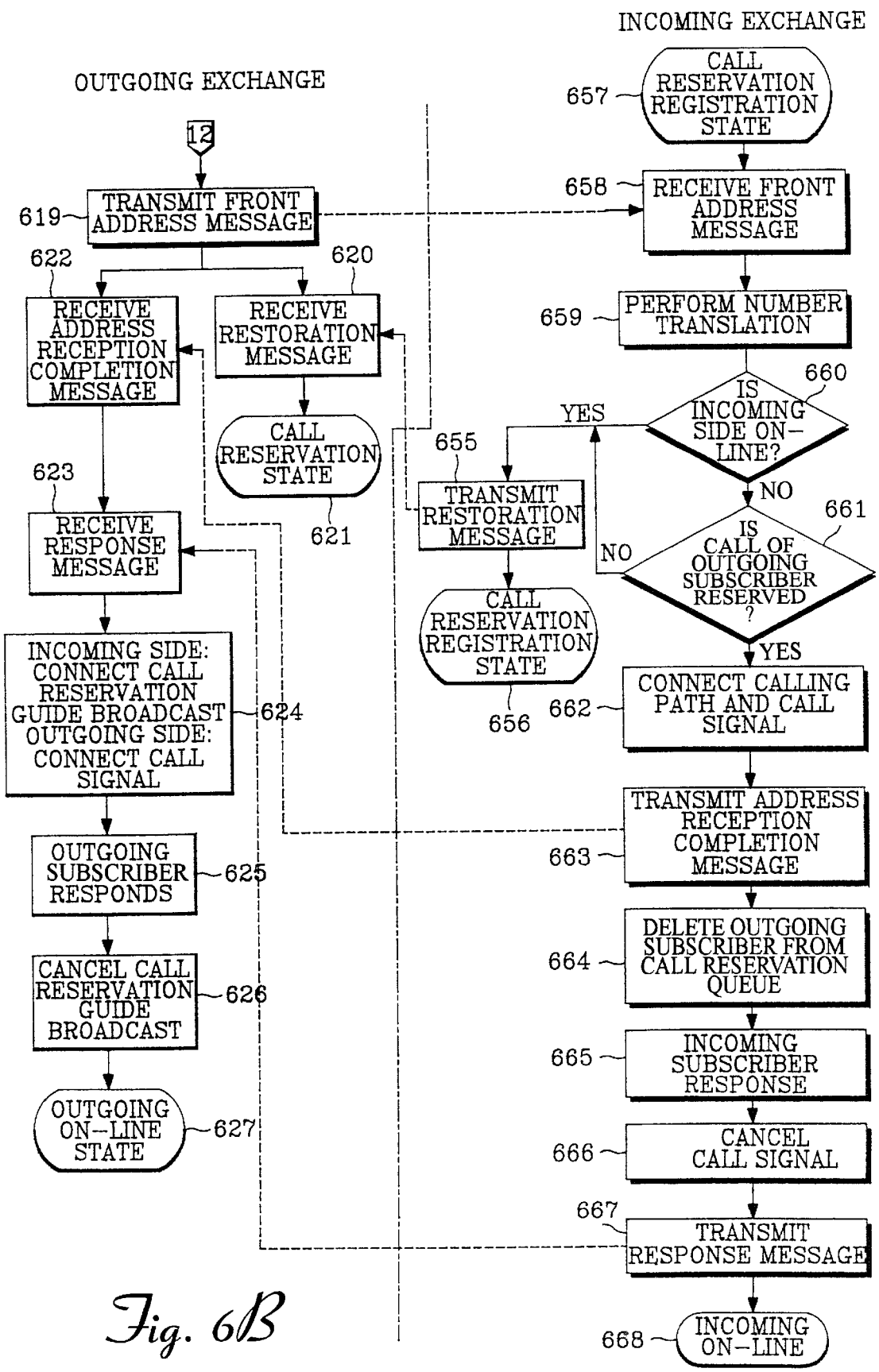

FIGS. 6A–6B together form a flowchart illustrating a procedure of processing the reserved call between the exchange of the outgoing subscriber and the exchange of the incoming subscriber according to the present invention.

Figure 7:
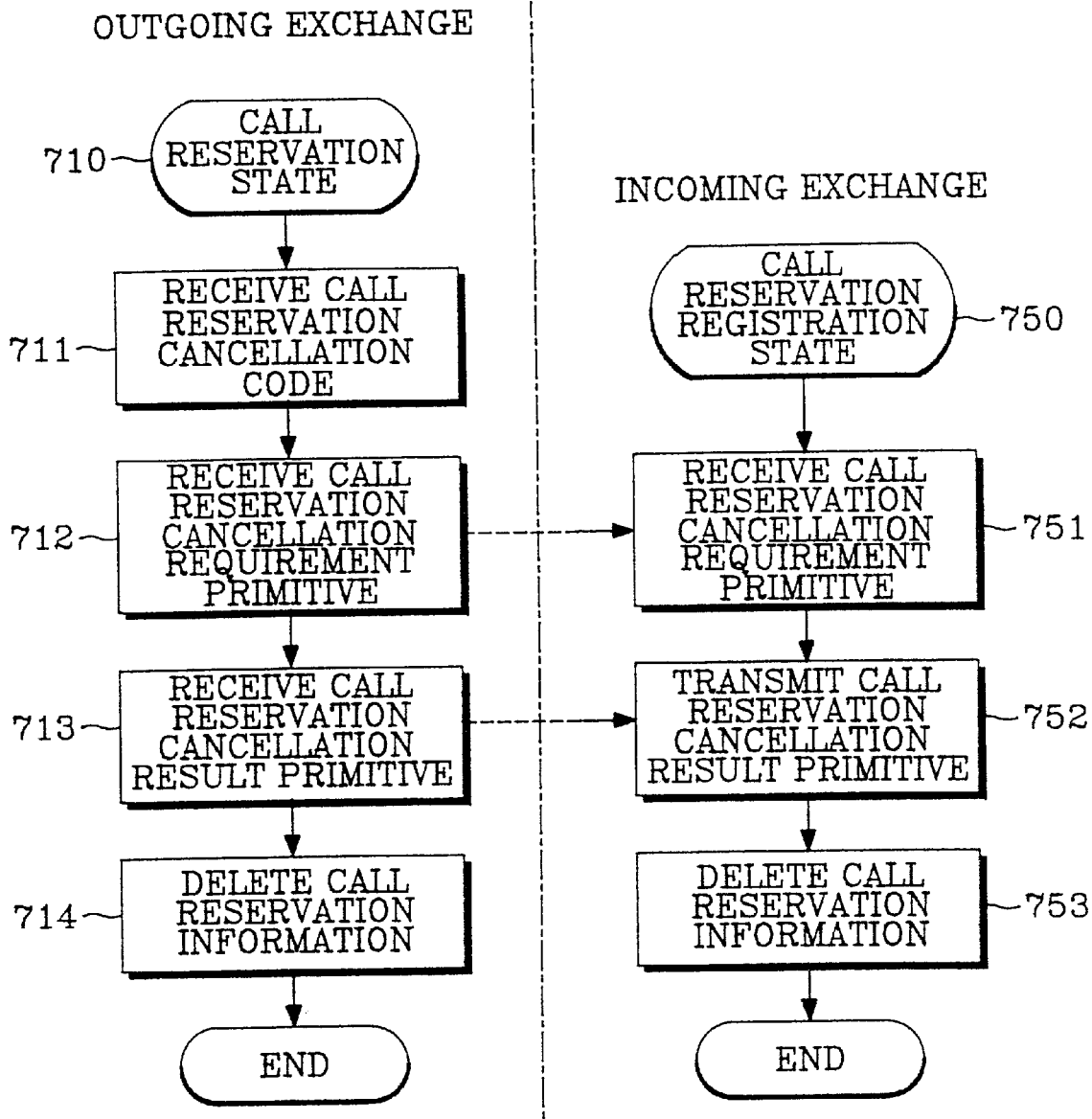
FIG. 7 is a flowchart illustrating a procedure of canceling a reserved call at the time of processing a call reservation for another exchange subscriber according to the present invention.
Figure 8:
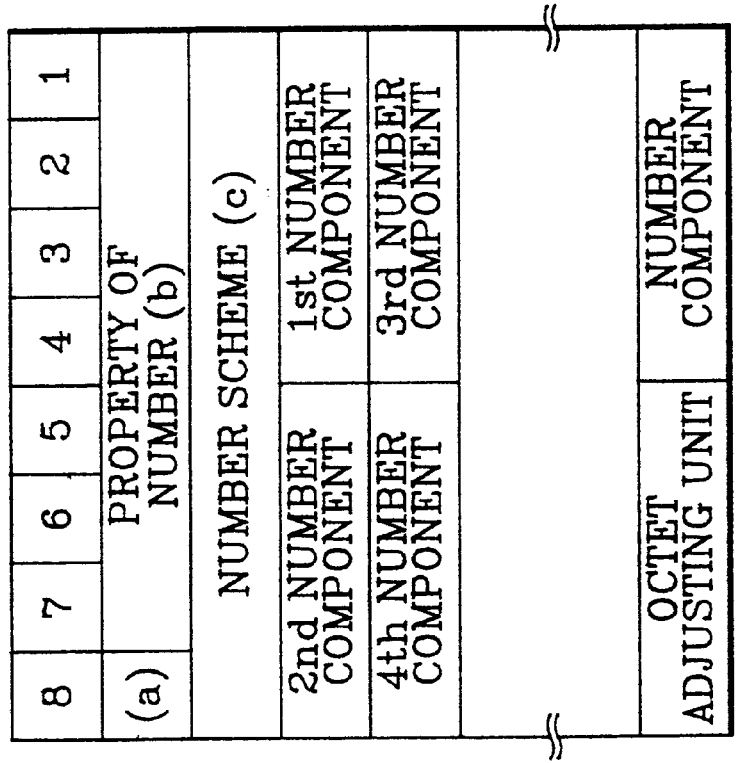
FIG. 8 is a view illustrating types of a format and an encoding of an information component.

FIG. 7 is a flowchart illustrating a procedure of canceling the reserved call between the exchange of the outgoing subscriber and the exchange of the incoming subscriber according to the present invention. FIG. 8 is a view illustrating types of an incoming number or an outgoing number in respective call reservation messages. The types of call reservation messages are composed of a message requiring a call reservation registration, a message requiring a call reservation cancellation, a message requiring a call reservation service, a message requiring a call reservation state, and a message notifying a call reservation state. The respective messages comprise the type of information illustrated in FIG. 8.

First, the procedure of reserving the call between the exchange of the outgoing subscriber and the exchange of the incoming subscriber will be described with reference to FIGS. 5A–5C. In the procedure of the call reservation registration according to the present invention, the call reservation procedure from step 511 to step 531 proceeds in the same sequence as an operation procedure of step 211 to step 231 of FIG. 2. In other words, information generated by the corresponding outgoing subscriber in the exchange of the outgoing subscriber is transmitted to the exchange of the incoming subscriber. If the corresponding subscriber is in the idle state, the exchange of the incoming subscriber forms the calling path and performs the call service. If the incoming subscriber is in the on-line state, the outgoing subscriber listens to the on-line tone. If the outgoing subscriber is provided with the function of the call reservation, the call reservation tone is outputted in step 531.

If the outgoing subscriber dials the call reservation code (for example, 0*) when the outgoing subscriber receives the call reservation tone, the exchange of the outgoing subscriber receives the call reservation code in step 532, and constructs a call reservation registration primitive as shown in Table 1, thereby transmitting the primitive to the exchange of the incoming subscriber in step 533, and waiting for a registration result generated from the exchange of the incoming subscriber in step 534.

indicator. A symbol (b) represents properties of the incoming number and the outgoing number. If the symbol (b) is 000-0000, it is for a spare. If the symbol (b) is 000-0001, it is for a subscriber number. If the symbol (b) is 000-0100, it is for a suburb an telephone, and if the symbol (b) is 000-0101, it is for an international telephone. A symbol (c) represents a number scheme. If the symbol (c) is 000-0001, it is for a telephone number network. If the symbol (c) is 000-0011, it is for a data network. A symbol (d) represents a number component. Number information from digits 0 to 9 (0000–1001) are stored in the symbol (d).

If the call reservation registration primitive is outputted as in the above Table 1, the exchange of the incoming subscriber receives the call reservation registration primitive in step 556, the incoming subscriber number in the call reservation registration primitive is translated, so as to determine a corresponding subscriber in step 557, and then a determination is made as to whether the corresponding incoming subscriber is a possible call reservation registration state in step 558.

If the incoming subscriber is an impossible call reservation registration state, then the exchange of the incoming subscriber constructs the message of the call reservation registration result (a registration failure) into an information component format and with encoding details such as in the above Table 1, and transmits it to the exchange of the outgoing subscriber. If the call reservation registration result message (registration failure) is outputted from the exchange of the incoming subscriber, then the exchange of the outgoing subscriber waiting the registration result in step 534 receives the message of the call reservation registration result (registration failure) in step 538, and connects a failure tone to the outgoing subscriber requiring the call reservation registration in step 539, and terminates a procedure of the call reservation registration.

If however, the corresponding incoming subscriber is in a possible call reservation registration state in step 558, then the exchange of the incoming subscriber transmits the message of the call reservation registration result (registration success) to the exchange of the outgoing subscriber such as in the above Table 1 in step 559, and then stores the call reservation information (the outgoing subscriber number, and the number of the outgoing exchange) in step 560, and then transmits the state of the corresponding incoming subscriber to the state of the call reservation registration in step 561. If the message of the call reservation registration result (registration success) is outputted from the exchange of the incoming subscriber, then the exchange of the outgoing subscriber waiting the registration result receives the message of the call reservation registration result (registration success) in step 535, and accordingly

TABLE 1

| Operation kinds | Grade | Code | Component item | Essential/ selective | Length | Tag | Encode |
|---|---|---|---|---|---|---|---|
| Registration required | 1 | 0000– 0001 | Incoming number | Essential | ≦10 | 1000– 0011 | (A) |
| | | | Outgoing number | Essential | ≦10 | 1000– 0100 | (A) |
| | | | Registration result | Essential | 1 | 1000– 0111 | (B) |

In the above Table 1, the outgoing number and the incoming number are constructed by information as shown in FIG. 8. In FIG. 8, a symbol (a) is an odd and even stores the call reservation information (the incoming subscriber number information, and the number of the incoming exchange) therein and connects a registration success tone to the outgoing subscriber in step 536, and transmits the state of the outgoing subscriber to the state of the call reservation in step 537.

Referring to FIGS. 6A–6B, a procedure of processing the reserved call in the call reservation state of the exchanges of the incoming subscriber and the outgoing subscriber will be described. In this case, the exchanges of the incoming subscriber and the outgoing subscriber are respectively in the state of the call reservation registration in steps 610 and 650. If the incoming subscriber terminates and restores the calling in the state of the call restoration registration, then the exchange of the incoming subscriber acknowledges the restoration of the incoming subscriber in step 651, and then constructs the message requiring the call reservation service such as shown below in Table 2 from stored call reservation information, transmitting the constructed message to the exchange of the outgoing subscriber in step 652.

The exchange of the outgoing subscriber then extracts the number of the incoming subscriber from a stored call reservation registration information, performing a number translation and a routing data translation, and then occupies the outgoing trunk line and connects the calling path in steps 616, 617 and 618, and then transmits a front address message to the exchange of the incoming subscriber in step 619, and then waits the reception of the message outputted from the exchange of the incoming subscriber. If the exchange of the outgoing subscriber transmits the front address message, then the exchange of the incoming subscriber, being in the state of the call reservation registration, receives the transmitted front address message in step 658, and then extracts the number of the incoming subscriber from the front address message, performing the number translation in step 659, and then checks the state of the incoming subscriber in step 660. If the incoming subscriber is in the on-line state, then the restoration message is

TABLE 2

| Operation kinds | Grade | Code | Component item | Essential/ selective | Length | Tag | Encoding |
|---|---|---|---|---|---|---|---|
| Service required | 1 | 0000–0011 | Incoming number | essential | ≦10 | 1000–0011 | (A) |
| | | | Outgoing number | essential | ≦10 | 1000–0100 | (A) |
| | | | Registration result | essential | 1 | 1000–0111 | (B) |

The incoming number and the outgoing number have a structure as shown in FIG. 8. After the message requiring the call reservation service of Table 2 is outputted from the exchange of the incoming subscriber, the exchange of the incoming subscriber waits a reception of a response message to the outputted message requiring the call reservation service.

If the message requiring the call reservation service shown in the Table 2 is outputted from the exchange of the incoming subscriber, then the exchange of the outgoing subscriber receives the message requiring the call reservation service in step 611, and checks the state of the outgoing subscriber in step 612. If the outgoing subscriber is not in the idle state, the exchange of the outgoing subscriber constructs a response message requiring the call reservation service (service failure), transmitting the constructed response message to the outgoing exchange and being transferred to the call reservation state in step 613. If the response message requiring the call reservation service (service failure) is outputted from the exchange of the outgoing subscriber, then the exchange of the incoming subscriber receives the failure response message requiring the call reservation service in step 655, and then maintains the state of the incoming subscriber in the state of the call reservation registration in step 656.

If however, the outgoing subscriber is in the idle state in step 612, then the exchange of the outgoing subscriber constructs the response message requiring the call reservation service (service success), transmitting the constructed message to the exchange of the incoming subscriber. As mentioned above, if the response message requiring the call reservation service (service success) is outputted from the exchange of the outgoing subscriber, the exchange of the incoming subscriber receives the success response message requiring the call reservation service in step 653, and transfers the state of the incoming subscriber to the standby state of the call reservation service in step 654.

transmitted to the exchange of the outgoing subscriber in step 655. And then, the exchange of the outgoing subscriber receives the restoration message transmitted from the exchange of the incoming subscriber in step 620, and then maintains the state of the outgoing subscriber in the state of the call reservation in step 621.

If however, the incoming subscriber is in the idle state in step 660, then the exchange of the incoming subscriber checks whether the corresponding call is the reserved call of the outgoing subscriber in step 661. If the generated call is not the reserved call of the outgoing subscriber, then the exchange of the incoming subscriber transmits the restoration message to the exchange of the outgoing subscriber in step 655. And then, the exchange of the outgoing subscriber receives the restoration message transmitted from the exchange of the incoming subscriber in step 620, and then maintains the state of the outgoing subscriber in the state of the call reservation in step 621.

If however, the incoming subscriber is in the idle state and the generated call is the reserved call of the outgoing subscriber, then the exchange of the incoming subscriber connects the calling path, connects the call signal to the incoming subscriber in step 622, and transmits the address reception completion message to the exchange of the outgoing subscriber in step 633. And then, the exchange of the incoming subscriber deletes the corresponding outgoing subscriber from the call reservation information of the incoming subscriber in step 664. And then, if the incoming subscriber responds, the exchange of the incoming subscriber acknowledges the response of the incoming subscriber in step 665, cancels the call signal connected to the incoming subscriber in step 666, transmits a response message to the exchange of the outgoing subscriber in step 667, and is transferred to the incoming on-line state in step 668.

As mentioned above, the exchange of the incoming subscriber transmits the address reception completion message and the response message to the exchange of the outgoing subscriber when the reserved call is processed. And thus, the exchange of the outgoing subscriber receives the address reception completion message in step 622, and receives the response message in step 623. And thus, the exchange of the outgoing subscriber connects the call reservation guide broadcast to the exchange of the incoming subscriber and connects the call signal to the outgoing subscriber in step 624. And then, if the outgoing subscriber responds, the exchange of the outgoing subscriber acknowledges the response of the outgoing subscriber in step 625, cancels a connection of the call signal and the guide broadcast in step 626, and is transferred to the outgoing on-line state in step 627.

Referring to FIG. 7, a procedure of reserving the call and canceling the registered reservation call between the exchange of the outgoing subscriber and the exchange of the incoming subscriber will be described. If the outgoing subscriber performs an off-hook operation and then dials the call reservation cancellation code (e.g., #10*) in order to cancel the reserved call in the call reservation state, the exchange of the outgoing subscriber, being in the call reservation state of step 710, acknowledges the call reservation cancellation code in step 711, and obtains information of the incoming subscriber from the call reservation information stored in an area of the corresponding subscriber and then generates the message requiring the call reservation cancellation as shown below in Table 3 and transmits the generated message to the exchange of the incoming subscriber.

At this time, as shown in Table 3 above, the incoming number and the outgoing number have a structure as shown in FIG. 8. The exchange of the outgoing subscriber outputs the message requiring the call reservation service shown in Table 3, and then the exchange of the incoming subscriber waits a reception of the response result message to the outputted message. The exchange of the incoming subscriber, being in the call reservation registration state of step 750, receives the message requiring the call reservation cancellation in step 751, constructs the response message requiring the call reservation cancellation to thereby transmit the response message to the exchange of the outgoing subscriber in step 752, extracts the number of the incoming subscriber from the received message requiring the call reservation cancellation to thereby delete information of the corresponding incoming subscriber from the call reservation information in step 753 and performs an ending.

The exchange of the outgoing subscriber receives the response message requiring the call reservation cancellation transmitted from the exchange of the incoming subscriber in step 713, and deletes call reservation information of the outgoing subscriber in step 714 and then performs the ending. The format and the encoding of the message transmitted and received between the exchanges of the outgoing subscriber and the incoming subscriber for performing the call reservation are shown below in Table 4.

TABLE 3

| Operation kinds | Grade | Code | Component item | Essential/selective | Length | Tag | Encoding |
|---|---|---|---|---|---|---|---|
| Cancellation required | 1 | 0000–0010 | Incoming number | Essential | ≤10 | 1000–0011 | (A) |
| | | | Outgoing number | Essential | ≤10 | 1000–0100 | (A) |
| | | | Registration result | Essential | 1 | 1000–0111 | (B) |

TABLE 4

| Operation kinds | Grade | Code | Component item | Essential/selective | Length | Tag | Encoding |
|---|---|---|---|---|---|---|---|
| Registration required | 1 | 0000–0001 | Incoming number | Essential | ≤10 | 1000–0011 | (A) |
| | | | Outgoing number | Essential | ≤10 | 1000–0100 | (A) |
| | | | Registration result | Essential | 1 | 1000–0111 | (B) |
| Cancellation required | 1 | 0000–0010 | Incoming number | Essential | ≤10 | 1000–0011 | (A) |
| | | | Outgoing number | Essential | ≤10 | 1000–0100 | (A) |
| | | | Cancellation result | Essential | 1 | 1000–0111 | (B) |
| Service required | 1 | 0000–0011 | Incoming number | Essential | ≤10 | 1000–0011 | (A) |
| | | | Outgoing number | Essential | ≤10 | 1000–0100 | (A) |
| | | | Requirement result | Essential | 1 | 1000–0111 | (B) |
| State required | 1 | 0000–0100 | Incoming number | Essential | ≤10 | 1000–0011 | (A) |

TABLE 4-continued

| Operation kinds | Grade | Code | Component item | Essential/ selective | Length | Tag | Encoding |
|---|---|---|---|---|---|---|---|
| | | | Outgoing number | Essential | ≦10 | 1000–0100 | (A) |
| | | | Subscriber state | Essential | 1 | 1000–0111 | (B) |
| State notification | 1 | 000–0101 | Incoming number | Essential | ≦10 | 1000–0011 | (A) |
| | | | Outgoing number | Essential | ≦10 | 1000–0100 | (A) |
| | | | Subscriber state | Essential | 1 | 1000–0101 | (B) |

As mentioned above, the call reservation method according to the present invention has the following advantages by embodying the call reattempt function of another exchange subscriber so that information is transmitted and received between the incoming exchange and the outgoing exchange by utilizing a questioning/answering function of the No. 7 signaling. First, in the exchange of the incoming subscriber in which the call reservation is registered, the state of the incoming subscriber is checked and it is possible to connect the incoming subscriber to the outgoing subscriber performing the call reservation, as soon as the incoming subscriber restores the call. Second, unnecessary occupation of the inter-office trunk line (that is, occupation of the inter-office trunk line caused by regeneration of the call for checking whether the incoming subscriber is restored in the continuous on-line state of the incoming subscriber) can be prevented. Third, in the case that a plurality of outgoing subscribers make a reservation of the call for the identical incoming subscriber, it is possible to perform a sequential call reservation service by connecting the incoming subscriber to the outgoing subscriber in a reserved sequence of the incoming subscriber. Fourth, a load of the exchange can be reduced by preventing unnecessary load to be applied to the incoming and outgoing exchanges which results from the call continuously generated even in the on-line state.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A call reservation method of a first exchange serving a call of an outgoing subscriber and a second exchange serving a call of an incoming subscriber, comprising the steps of:

outputting a message requiring a call reservation registration from said first exchange to said second exchange at the time of reserving said call;

storing call reservation information in said second exchange, according to said message requiring said call reservation registration;

transferring said second exchange to a state of said call reservation registration in response to said message requiring said call reservation registration and simultaneously outputting a call reservation registration response message to said first exchange;

storing said call reservation information in said first exchange according to said call reservation registration response message and transferring said first exchange to a state of a call reservation;

said first exchange checking said state of said incoming subscriber in said second exchange upon said second exchange being in said state of said call reservation registration and then inputting said message requiring said call reservation service to said second exchange upon said incoming subscriber being in an idle state;

checking said state of said outgoing subscriber in said first exchange according to said message requiring said call reservation service and then forming a calling path of said outgoing subscriber and said incoming subscriber in said first exchange and said second exchange; and processing said call, upon said outgoing subscriber being in said idle state.

2. A call reservation method of a first exchange serving a call of an outgoing subscriber and a second exchange serving a call of an incoming subscriber, comprising the steps of:

outputting a message requiring a call reservation registration from said first exchange to said second exchange at the time of reserving said call;

storing call reservation information in said second exchange according to said message requiring said call reservation registration;

transferring said second exchange to a state of said call reservation registration in response to said message requiring said call reservation registration and simultaneously outputting a call reservation registration response message to said first exchange;

storing said call reservation information in said first exchange according to said call reservation registration response message and transferring said first exchange to a state of a call reservation;

said first exchange checking said state of said incoming subscriber in said second exchange upon said second exchange being in said state of said call reservation registration and then inputting said message requiring said call reservation service to said second exchange upon said incoming subscriber being in an idle state;

checking said state of said outgoing subscriber in said first exchange according to said message requiring said call reservation service in said first exchange and then forming a calling path of said outgoing subscriber and said incoming subscriber in said first exchange and said second exchange;

processing said call upon said outgoing subscriber being in said idle state;

outputting a message requiring a call reservation cancellation from said first exchange at the time of receiving a call reservation cancellation code upon said second exchange being in said state of said call reservation;

responding to said message requiring said state of said call reservation cancellation from said first exchange and deleting said call reservation information in said second exchange;

and deleting said call reservation information in said second exchange according to said response message of said call reservation cancellation in said first exchange.

3. A method of handling a reserved call between a first exchange serving a call of an outgoing subscriber while in a call reservation state, and a second exchange serving a call of an incoming subscriber while in a call reservation registration state, comprising the steps of:

transmitting a message requiring a call reservation service upon an incoming subscriber in said second exchange being in said call reservation registration state;

checking a state of said outgoing subscriber reserving said call in said first exchange receiving said message requiring said call reservation service;

outputting a response message notifying a call reservation service requirement failure upon said outgoing subscriber being not in an idle state;

repeatedly performing said checking and outputting steps by transferring said state of said incoming subscriber to said state of said call reservation registration in said second exchange receiving said response message of said call reservation service requirement failure;

outputting a response message of a call reservation service requirement success upon said outgoing subscriber being in an idle state;

transferring said state of said incoming subscriber to a call reservation service standby state in said second exchange receiving said response message of said call reservation service requirement success; and forming a calling path of said outgoing subscriber and said incoming subscriber in said first exchange and said second exchange, so as to perform a calling service.

4. A call reservation apparatus including a first exchange serving a call of an outgoing subscriber and a second exchange serving a call of an incoming subscriber, comprising:

a means for outputting a message requiring a call reservation registration from said first exchange to said second exchange at the time of reserving said call;

a means for storing call reservation information in said second exchange according to said message requiring said call reservation registration;

a means for transferring said second exchange to a state of said call reservation registration in response to said message requiting said call reservation registration and simultaneously outputting a call reservation registration response message to said first exchange;

a means for storing said call reservation information in said first exchange according to said call reservation registration response message and transferring said first exchange to a state of a call reservation;

said first exchange including a means for checking said state of said incoming subscriber in said second exchange upon said second exchange being in said state of said call reservation registration and then inputting said message requiring said call reservation service to said second exchange upon said incoming subscriber being in an idle state;

a means for checking said state of said outgoing subscriber in said first exchange according to said message requiring said call reservation service in said first exchange and then forming a calling path of said outgoing subscriber and said incoming subscriber in said first exchange and said second exchange; and a means for processing said call, upon said outgoing subscriber being in said idle state.

5. A call reservation apparatus including a first exchange serving a call of an outgoing subscriber and a second exchange serving a call of an incoming subscriber, comprising:

a means for outputting a message requiring a call reservation registration from said first exchange to said second exchange at the time of reserving said call;

storing call reservation information in said second exchange according to said message requiring said call reservation registration;

a means for transferring said second exchange to a state of said call reservation registration in response to said message requiring said call reservation registration and simultaneously outputting a call reservation registration response message to said first exchange;

a means for storing said call reservation information in said first exchange according to said call reservation registration response message and transferring said first exchange to a state of a call reservation;

said first exchange including a means for checking said state of said incoming subscriber in said second exchange upon said second exchange being in said state of said call reservation registration and then inputting said message requiring said call reservation service to said second exchange upon said incoming subscriber being in an idle state;

a means for checking said state of said outgoing subscriber in said first exchange according to said message requiring said call reservation service and then forming a calling path of said outgoing subscriber and said incoming subscriber in said first exchange and said second exchange;

a means for processing said call upon said outgoing subscriber being in said idle state;

a means for outputting a message requiring a call reservation cancellation from said first exchange at the time of receiving a call reservation cancellation code upon said second exchange being in said state of said call reservation;

a means for responding to said message requiring said state of said call reservation cancellation from said first exchange and deleting said call reservation information in said second exchange; and a means for deleting said call reservation information according to said response message of said call reservation cancellation in said first exchange.

6. An apparatus for handling a reserved call between a first exchange serving a call of an outgoing subscriber while in a call reservation state, and a second exchange serving a call of an incoming subscriber while in a call reservation registration state, comprising:

a means for transmitting a message requiring a call reservation service upon an incoming subscriber in said second exchange being in said call reservation registration state;

a means for checking a state of said outgoing subscriber reserving said call in said first exchange receiving said message requiring said call reservation service;

a means for outputting a response message notifying a call reservation service requirement failure upon said outgoing subscriber not being in an idle state;

a means for repeatedly performing said checking and outputting steps by transferring said state of said incoming subscriber to said state of said call reservation registration in said second exchange receiving said response message of said call reservation service requirement failure;

a means for outputting a response message of a call reservation service requirement success said outgoing subscriber being in an idle state;

a means for transferring said state of said incoming subscriber to a call reservation service standby state in said second exchange receiving said response message of said call reservation service requirement success; and a means for forming a calling path of said outgoing subscriber and said incoming subscriber in said first exchange and said second exchange, so as to perform a calling service.

* * * * *